United States Patent
Shrader et al.

(10) Patent No.: US 6,374,359 B1
(45) Date of Patent: Apr. 16, 2002

(54) DYNAMIC USE AND VALIDATION OF HTTP COOKIES FOR AUTHENTICATION

(75) Inventors: Theodore Jack London Shrader, Cedar Park; Garry L. Child; William H. Gengler, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/195,859

(22) Filed: Nov. 19, 1998

(51) Int. Cl.$^7$ .............................. H04L 9/32; H04L 12/22
(52) U.S. Cl. ...................... 713/201; 709/229; 713/183
(58) Field of Search ................................ 713/173, 185, 713/202, 162; 709/224, 225, 227, 229

(56) References Cited

U.S. PATENT DOCUMENTS

| | | | | |
|---|---|---|---|---|
| 5,875,296 A | * | 2/1999 | Shi et al. ................ | 395/188.01 |
| 6,085,224 A | * | 6/2000 | Wagner ....................... | 709/203 |
| 6,092,196 A | * | 7/2000 | Reiche ....................... | 713/200 |
| 6,112,240 A | * | 8/2000 | Pogue et al. ................ | 709/224 |
| 6,205,480 B1 | * | 3/2001 | Broadhurst et al. ......... | 709/225 |
| 6,226,752 B1 | * | 5/2001 | Gupta et al. ................ | 713/201 |
| 6,304,906 B1 | * | 10/2001 | Bhatti et al. ................ | 709/227 |

OTHER PUBLICATIONS

Microsoft Computer Dictionary Fourth Edition: 1999 by Microsoft Press, p. 266.*

* cited by examiner

Primary Examiner—Gail Hayes
Assistant Examiner—Leynna Ha
(74) Attorney, Agent, or Firm—Jeffrey S. LaBaw; David Judson; Joseph R. Burwell (57) ABSTRACT

A method of enabling a Web browser user to interact with a given application running on a Web server begins by constructing and returning a cookie to the Web browser upon a given occurrence, e.g., user login to the application. Without additional user input, the routine then forces the Web browser to check with the Web server that the cookie was set on the Web browser. Preferably, this is accomplished by sending the cookie from the Web server in a refresh page that redirects the HTTP flow back to itself with a parameter to check if the cookie was set. At the Web server, a test is then done to determine whether the cookie is valid. If so, the user is allowed to interact with the given server application (e.g., to take a given action or to log off from the application without closing the Web browser). A novel cookie construction and validation mechanism is also described.

20 Claims, 3 Drawing Sheets

Content-type: text/html,

Set-Cookie: ldapweb=%A2%80%10%F8%EA%CD%DF%FC%BF%15%88%8C%FC%4B%13%51%01%86%B8%C9%93%C1%E0%C1%E4%2E%D6%02%67%1F%AE%EE; path=/

<HTML>
<HEAD>

<META NAME="LDAP Refresh"    HTTP-EQUIV="Refresh" CONTENT="/ldap/cgi-bin/ldacgi.exe?Action=Refresh&Submit=Submit&RefreshAction=Login">

</HEAD>

<BODY>
</BODY>

</HTML>

FIG. 7

DYNAMIC USE AND VALIDATION OF HTTP COOKIES FOR AUTHENTICATION

BACKGROUND OF THE INVENTION

1. Technical Field

The present invention relates generally to client-server Web-based transaction processing and, in particular, to authenticating users to access applications running on a Web server.

2. Description of the Related Art

The World Wide Web (WWW) of the Internet is the most successful distributed application in the history of computing. A conventional Web transaction involves a "client," which runs a browser, and a "server." In response to specification of a link at the browser, the client makes a request to the server identified in the link and, in return, receives a document or other object formatted according to HTML.

The Web server is usually a standalone file server that services various Web document requests. Because the server is self-contained, Web site administration typically is cumbersome because access control must be individualized for each device. Moreover, private and public enterprises are now setting up so-called "Intranets" within their organizations to allow employees and customers to access data on their own corporate Web sites. Such organizations use multiple computers interconnected into a distributed computing environment in which users access distributed resources and process applications. Such architectures complicate the administration function.

An administration interface that runs on the Web server, for example, the Lightweight Directory Access Protocol (LDAP) GUI CGI, needs a mechanism to obtain a user name and password from a user at a Web browser to authenticate the user for administrative or directory tasks. In particular, the administration interface needs to associate this userid and password combination at the user's Web browser without forcing the user to login for each transaction. In the prior art, it is known to provide an administration interface of this type using a server plug-in to authenticate the Web browser user and thereby enable Web-based access to secure documents. In this technique, which is described in copending application Ser. No. 08/790,041, titled "Distributed File System Web Server User Authentication With Cookies" assigned to the assignee of this application, a cookie is used to represent an client authentication token. This approach assumes that cookies are supported by the browser; thus, the scheme does not account for the situation where a cookie value is not set by the client. Moreover, such known server-based schemes rely on the HTTP 401 authentication method. An authentication plug-in written for a specific Web server to support HTTP 401 cannot be ported across different Web servers. Moreover, HTTP 401 authentication requires users to shutdown all instances of their Web browser before logoff from the Web-based application.

There remains a need in the art to provide Web server user authentication that overcomes these and other problems associated with the prior art.

BRIEF SUMMARY OF THE INVENTION

It is an object of the present invention to provide an architecture for the dynamic use and validation of HTTP cookies for authentication by an application running on a web server.

A more specific object of this invention is to provide an automatic check to determine if a cookie is set on a web browser. In particular, the inventive mechanism advantageously uses a refresh object or page to allow a Web server GUI to automatically determine if the cookie has been set.

Another more specific object of this invention is to provide in-depth validation of a cookie value. The validation process preferably encompasses encryption, encoding, decoding, and decryption, as well as additional validation mechanisms to ensure that the cookie is valid for the user.

It is a still another object of this invention to provide a mechanism that ensures that an authentication token is set on a client web browser prior to the user's accessing of an action menu.

It is still another object of this invention to ensure that a first user logs off from a web server completely so that a subsequent user cannot use the first user's userid and password to access protected documents or services.

Still another object of this invention is to provide cookie-based user authentication and thereby allow Web applications to be Web server neutral. As a by-product, the present invention obviates Web server-specific authentication plug-ins.

Another important object of the present invention is to provide an algorithm for constructing a cookie value using an encryption and encoding scheme. The cookie value is then validated using a corresponding decoding and decrypting scheme.

These and other objects of the invention are provided in a method of authenticating a Web browser user to a given Web server application, such as a directory service GUI interface. In a preferred embodiment, a method of enabling the Web browser user to interact with the given application running on a Web server begins by constructing and returning a cookie to the Web browser upon a given occurrence, e.g., user login to the application. Without additional user input, the routine then forces the Web browser to check with the Web server that the cookie was set on the Web browser. Preferably, this is accomplished by sending the cookie from the Web server in a refresh page that redirects the HTTP flow back to itself with a parameter to check if the cookie was set. At the Web server, a test is then done to determine whether the cookie (returned from the browser) is valid. If so, the user is allowed to interact with the given server application (e.g., to take a given action or to log off from the application without closing the Web browser).

In the preferred embodiment, the cookie is an ASCII string generated by concatenating into a derived value a userid, password and other information, such as the client machine IP address. The derived value is then encrypted to generate a binary String, and the binary string is then encoded into the ASCII string. That string is then sent to the Web browser in the refresh page together with the check parameter to facilitate the automatic check (on whether the cookie was set on the browser). Given this cookie construction, the step of determining whether the cookie is valid begins by decoding the ASCII string to generate a resulting binary value. The resulting binary value is then decrypted to generate a resulting derived value. A test is then performed to determine whether the IP address in the resulting derived value matches an IP address of a client machine on which the Web browser is running. If so, another test is performed to determine whether the user name and password in the resulting derived value match the user's user name and password. If so, the user is allowed to interact with the server application.

The given server application, in one embodiment, is a Lightweight Directory Access Protocol (LDAP) GUI interface.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
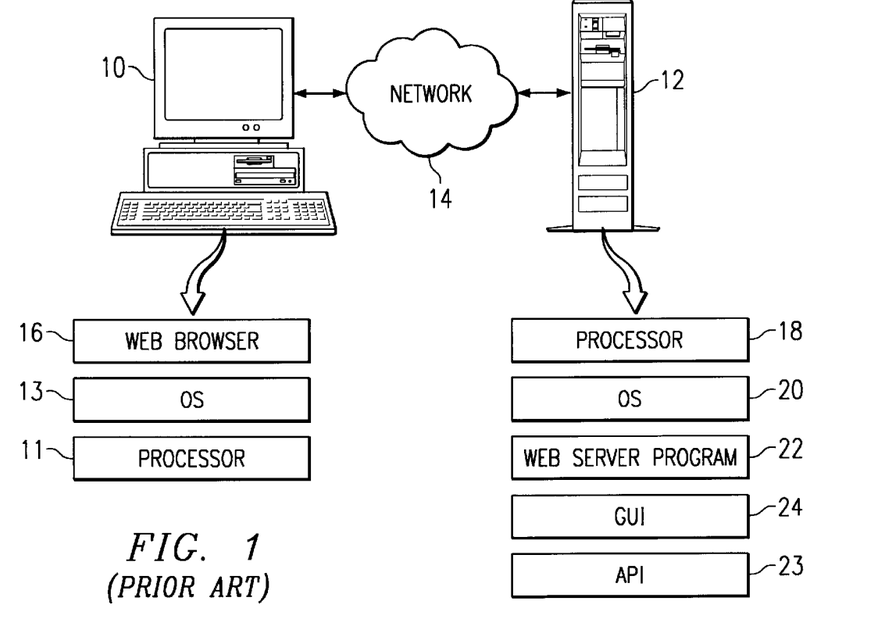
FIG. 1 is a simplified diagram of a known Internet-based client-server system.

By way of brief background, a known Internet-based client-server system is illustrated in FIG. 1. A client machine 10 is connected to a Web server platform 12 via network 14. For illustrative purposes, network 14 is the public Internet, an intranet or some other known network connection. Web server platform 12 is one of a plurality of servers which are accessible by clients, one of which is illustrated by machine 10. A representative client machine includes a browser 16, which is a known software tool used to access the servers of the network. The Web server platform supports files (collectively referred to as a "Web" site) in the form of hypertext documents and objects. In the Internet paradigm, a network path to a server is identified by a so-called URL or "Uniform Resource Locator" as defined in RFC 1945, which is incorporated herein by reference.

A representative Web server platform 12 comprises an IBM RISC System/6000 processor 18 (a reduced instruction set of so-called RISC-based workstation) running the AIX® (Advanced Interactive Executive Version 4.1 and above) operating system 20 and a Web server program 22, such as Netscape Enterprise Server Version x.0, that supports interface extensions. For example, an IBM Netfinity™ server may be used. The platform 12 also includes a graphical user interface (GUI) 24 for management and administration. The Web server also includes an Application Programming Interface (API) 23 that provides extensions to enable application developers to extend and/or customize the core functionality thereof through software programs including, without limitation, Common Gateway Interface (CGI) programs, servlets, plug-ins, and other programs and algorithms.

A representative Web client is a personal computer that includes an x86-, PowerPC®- or RISC-based processor 11, an operating system 13 such as IBM® OS/2® or Microsoft Windows '95, and that includes the browser 16, such as Netscape Navigator 3.0 (or higher), having a Java Virtual Machine (JVM) and support for application plug-ins and helper applications.

As is well-known, the Web server accepts a client request and returns a response. The communication between the browser and the server is conducted using the HTTP protocol. According to the present invention, it is assumed that the Web server supports a server application to which the user (at the client) desires access. By way of example only, the server application is an administration interface, such as the Lightweight Directory Access Protocol (LDAP) GUI CGI interface. This interface comprises a set of Common Gateway Interface routines (CGIs) that use the LDAP Application Programming Interface (API) to provide various known functions. As is well known, LDAP is a standalone directory service that has begun to obtain wide acceptability in Web enterprise environments. The LDAP API is described in "The C LDAP Application Program Interface", IETF Working Draft, Jul. 29, 1997, which is incorporated herein by reference.

Before using the functionality provided by the LDAP GUI from their Web browsers, users or administrators need to enter their LDAP user name (or distinguished name) and password on a login panel. These values are sent to the Web server and validated by the LDAP GUI CGIs. If the user name and password are valid, the LDAP GUI sends back a cookie that can be used for subsequent LDAP GUI transactions.

By way of brief background, HTTP cookies are used by Web servers to keep track of a user's state at the Web browser (e.g., how many times a user has visited a site with the browser), or to associate a userid or authentication token on the Web browser for authorization to documents or CGI programs running on the server. Once a cookie is set on a Web browser for a server's domain and URL path, the Web browser sends the cookie name and value pair to the matching Web server domain and path with each HTTP transaction.

The LDAP GUI CGI interface requires a mechanism to obtain a user name and password from a user at the Web browser to authenticate the user for administrative or directory tasks. In particular, the administration interface needs to associate this userid and password combination at the user's web browser without forcing the user to login for each transaction.

The present invention provides a mechanism to dynamically create and validate HTTP authentication cookies when a user of a Web browser desires to access a given application (e.g., an LDAP GUI CGI interface) running on a Web server supporting that application. For purposes of illustration only, the invention is described with respect to the LDAP GUI CGI interface application, although one of ordinary skill will appreciate that the dynamic use and validation of HTTP cookies provided by the inventive authentication scheme may be implemented to authenticate the user to other server applications. Thus, the server application is any program, routine, algorithm or e-business application provided from a set of one or more servers in the computer network.

Figure 2:
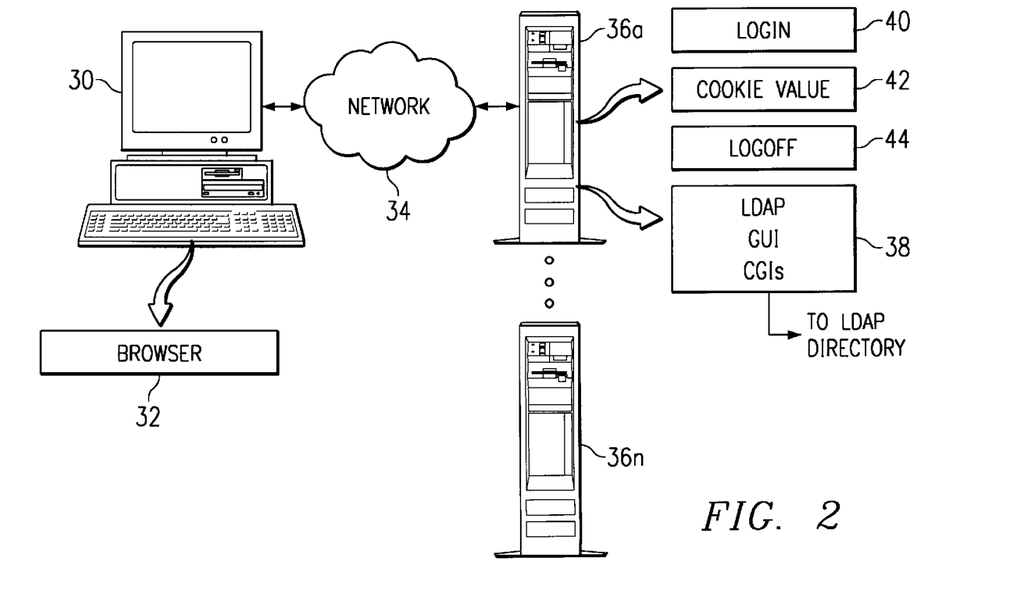
FIG. 2 is a block diagram of an illustrative embodiment of the present invention wherein HTTP cookie authentication is used to facilitate secure access to an LDAP GUI CGI authentication interface running on a Web server.

FIG. 2 is an illustrative embodiment of the present invention wherein HTTP cookie authentication is used to facilitate secure access to an LDAP GUI CGI authentication interface running on a Web server. In particular, the system includes a client machine 30 having a Web browser 32, which is connectable via network 34 to a set of one or more Web servers 36a–36n at least one of which supports a given server application 38, namely, the LDAP GUI CGI interface. Network 34 may be an intranet, an extranet, the Internet, or any known or later-developed computer network. The above-described objects of the present invention are provided by a login routine 40, a cookie value routine 42, and a logoff routine 44. In particular, the cookie value routine 42 is used to construct and validate a cookie value. As will be seen, according to the invention a cookie is constructed using general purpose values, such as userid, password and the client IP (Internet Protocol) address, and using encryption and encoding of values derived therefrom. As compared to the prior art, the invention thus does not require use of any process to maintain a table (or other data structure) in which the cookie and its corresponding representational values are stored. Rather, as will be described, the invention relies on the server application CGIs (for example) and their ability to extract the contents of the cookie as needed to facilitate authentication. The login routine 40 describes how the LDAP GUI sends back a cookie to the Web browser and ensures that the cookie was set. The logoff routine 44 describes how the user may logoff from the LDAP GUI without having to exit the Web browser.

Figure 3:
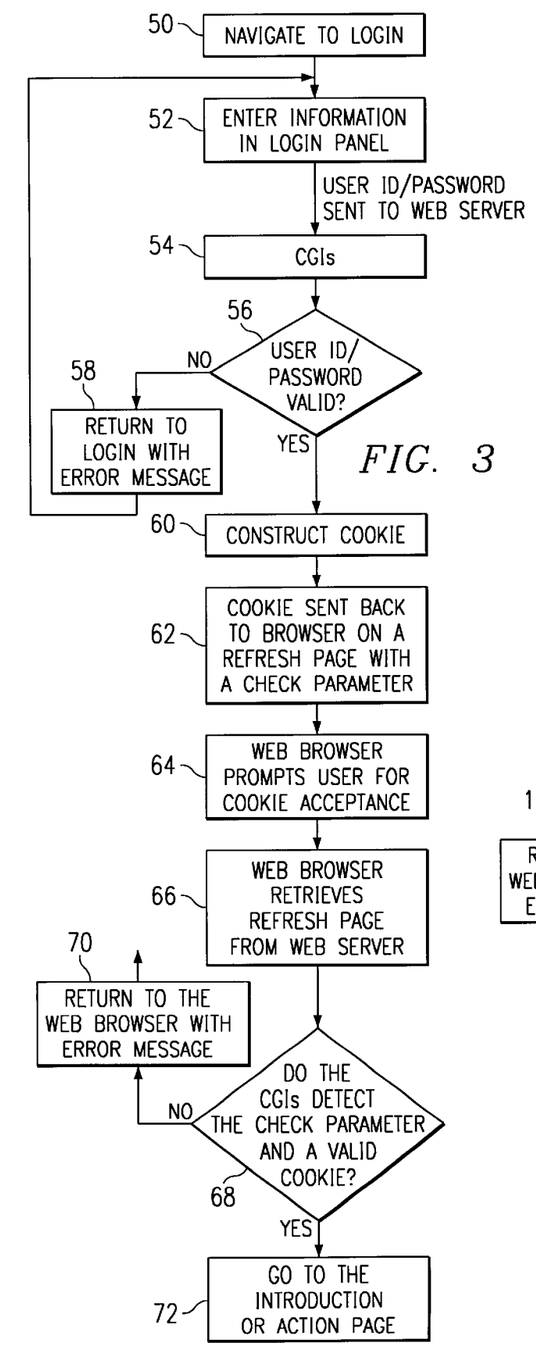
FIG. 3 is a flowchart illustrating a preferred embodiment of the login routine of the present invention.
Figure 4:
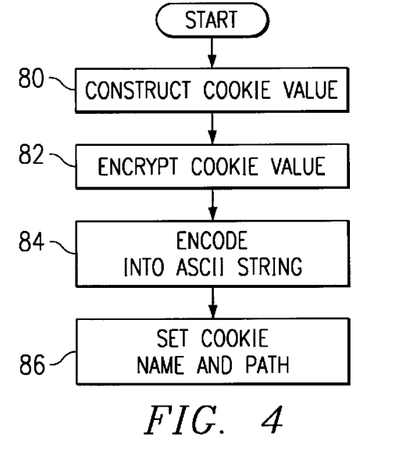
FIG. 4 is a flowchart illustrating a preferred construction function of a cookie value routine of the present invention.
Figure 5:
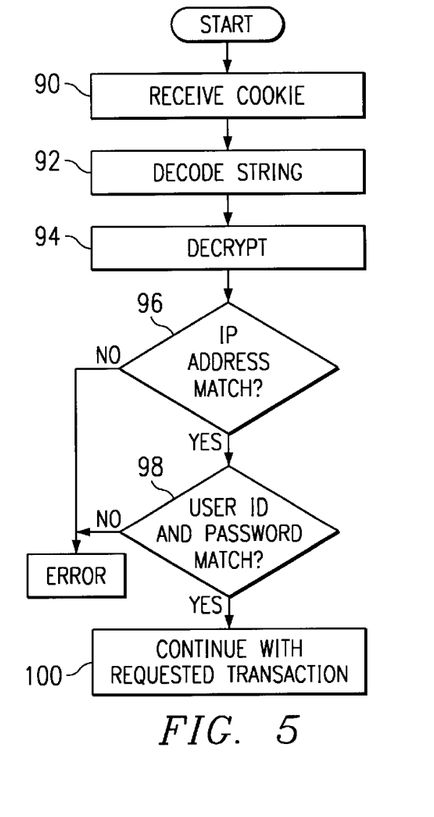
FIG. 5 illustrates a flowchart of a preferred validation function of the cookie value routine.
Figure 6:
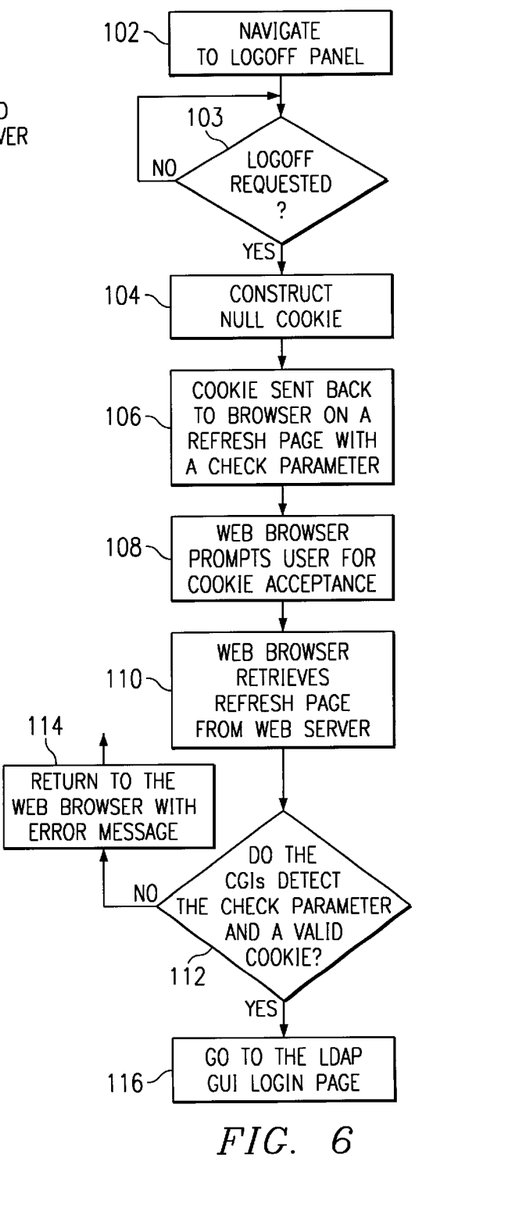
FIG. 6 illustrates a logoff routine of the present invention that enables a user to logoff from the LDAP GUI without exiting the Web browser.

Each of these routines preferably are supported and run on the server machine that supports the server application. Some of the functionality may be implemented on the client machine if desired. Collectively, these routines provide an architecture for the dynamic use and validation of HTTP cookies for authentication by an application running on the Web server. Generally, the inventive routines define and use cookies to authenticate users. FIG. 3 is a flowchart illustrating a preferred embodiment of the login routine 40. FIG. 4 is a flowchart illustrating a preferred construction function of the cookie value routine 42, and FIG. 5 illustrates a flowchart of a preferred validation function of the cookie value routine 42. FIG. 6 illustrates the logoff routine 44 that enables a user to logoff from the LDAP GUI without exiting the web browser. These routines are now described in detail below.

Login Process

The login routine 40 begins at step 50 with the user navigating to the LDAP GUI login panel (for example, by specifying a URL for the LDAP Web server without having been previously authenticated). At step 52, the user enters a user name and password and presses a Login button on the panel. The routine continues at step 54 to send the userid/password to the Web server. At step 56, the LDAP GUI Web server CGIs check to see if the user name and password are valid. This is accomplished, for example, by calling the appropriate LDAP API to determine whether the user seeking to log in exists in the directory. If the outcome of the test at step 56 indicates that the user name and password are not valid, the CGIs issue a user name and password error message at step 58 and control returns to step 52. If, however, the outcome of the test at step 56 indicates that the user name and password are valid, the routine continues at step 60. At this point, CGIs construct a unique cookie (as described below in FIG. 4), referred to herein as the "ldapweb" cookie. The CGIs provide that the cookie is not to be cached for a resetting during a reload of the page; rather, the cookie is kept by the browser for sending back to the Web server for subsequent requests on certain specified paths.

Figure 7:
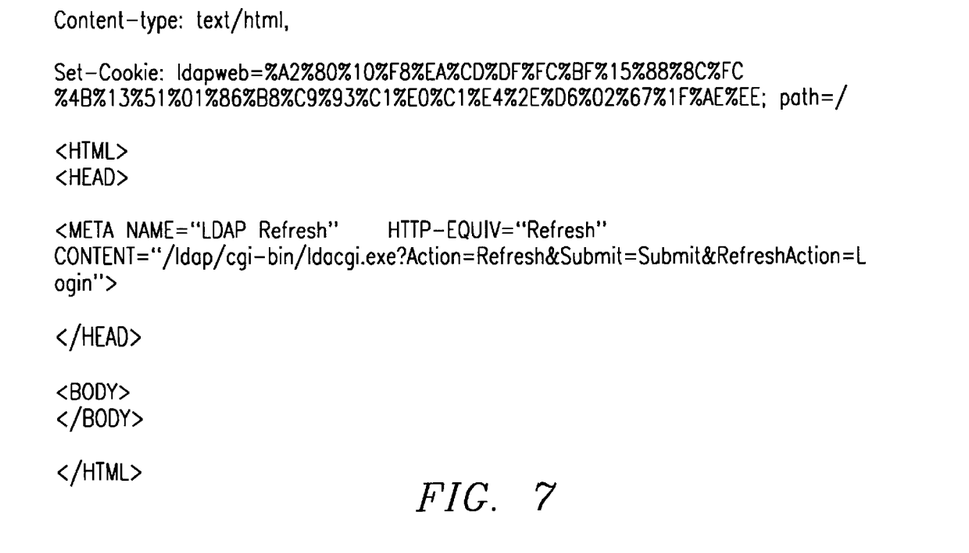
FIG. 7 illustrates representative HTML code of a redirect page generated by the Web server in accordance with the present invention.

At step 62, the login routine continues with the CGIs sending the cookie name and value back to the Web browser on a refresh page. The refresh page includes a check parameter, which is a variable that must get sent back to the Web server to facilitate authentication, as will be seen. FIG. 7 illustrates a representative refresh page, which is described in more detail below. The refresh page includes a set cookie tag, which sets the cookie value at the browser, and a redirect tag, which instructs the browser to go to a separate object (e.g., a page) that includes information for checking the parameter. As will be seen, the refresh page redirects HTTP flow back to itself with the parameter to check if the cookie was set. The user's Web browser receives the cookie and the refresh page. At step 64, the user and/or Web browser (depending on the browser setting) accepts or rejects the cookie. Regardless, the routine continues at step 66 with the user's Web browser automatically retrieving the refresh page from the Web server. In particular, the browser automatically goes to the refresh redirected page, and the ldapweb cookie value, if any, is sent back to the Web server. At step 68, the CGIs for the new refresh page check to see if a valid ldapweb cookie was set. If a valid ldapweb cookie was not set, the CGIs issue a "cookies not supported" error message at step 70 and control returns to step 50. If the ldapweb cookie was valid, the routine continues at step 72 with the CGIs returning an LDAP GUI introduction or action page to the user or administrator. This completes the login process.

Thus, in effect, steps 62, 64, 66 and 68 are used to determine whether the cookie has been set on the browser. Step 66 is carried out automatically to force the browser to navigate to a refresh object from which the check parameter may be tested for this purpose. FIG. 7 illustrates an example of the HTML code generated when the Web server sends back the redirect page. The set cookie value is before the HTML tags. The entire contents preferably are sent from the Web server to the Web browser. As described above, the Web browser first processes the set cookie value, prompting the user to accept the cookie, always accepting the cookie, or always declining the cookie, depending on what value is configured in the browser. A cookie may not be set on the Web browser for a number of reasons. For example, if the Web browser conditionally accepts cookies, the user could have rejected the cookie when prompted. Alternatively, the user could have set the web browser to reject all cookies. In the preferred embodiment as illustrated in FIG. 7, the ldapweb cookie value is encoded so that the binary values appear as flat ASCII after each percent "%" sign. This encoding process is described in more detail below.

The check parameter (in this case, RefreshAction) appears in the Refresh metatag. The Refresh HTTP-EQUIV values instruct the Web browser to redirect to the content value, which (in this case) is the ldapcgi.exe CGI with the name=value parameter values following the question mark.

Constructing and Validating Cookies

The login routine 40 described above illustrates how the LDAP GUI sends back a cookie to the Web browser and ensures that the cookie was set. This section describes a preferred technique for constructing the cookie before it gets sent back to the user's Web browser. This is step 60 in the flowchart of FIG. 3.

Preferably, the user name and password comprise part of the cookie value because (as will be seen) they will be extracted and used when the user accesses LDAP GUI functionality. Other values can also be stored to further validate the cookie and prevent an unauthorized user from capturing the cookie value and using it with his or her Web browser. These additional validation values include, for example, the client IP address, the timestamp at the Web server, and the like. For example, is may be desired to store the client IP address of the original login transaction with the user name and password. When validated, the LDAP GUI CGIs compare the extracted cookie IP address against the client IP address of the HTTP transaction. If they match, the LDAP GUI action can proceed as usual. No IP match would indicate that the cookie did not come from the same client or proxy for which it was set. As will be described, in such case the LDAP GUI would then send back an error and display the login panel.

The LDAP GUI preferably uses one cookie (named ldapweb as described above) and a compound value, which includes the user name and password, separated by a delimiting character that cannot be used within the individual values themselves, such as "$". FIG. 4 illustrates a flowchart for constructing the cookie value.

The cookie value routine 42 is initiated when the LDAP GUI CGI verifies the user name and password sent to it from the login panel of the user's web browser. The routine begins at Step 80 by constructing a cookie value, for example, username$password$ipaddress. As noted above, other validation values can be added as well. At step 82, the CGIs take the cookie value and encrypt it with a key to ensure that the plaintext values are not sent back to the user. The key may comprise part of a public key cryptosystem (PKC), with the corresponding key being used for decryption in a known manner. A representative software PKC product is known in the art as PGP (Pretty Good Privacy), which is available for download over the Internet. Other encryption techniques, such as a private key cryptosystem using a session key, or the like, may be used as well. Preferably, the key pair is constructed and stored locally (for root user access only) during configuration of the Web server.

Because the encrypted value is in binary, the routine then continues at step 84 with the CGIs encoding the cookie value to transform the encrypted value into an ASCII string that can be sent back in the HTTP header. FIG. 7 illustrates the representative ASCII string as previously noted. Before sending the complete cookie back with the next HTTP transaction to the Web browser, at step 86 the CGIs set the cookie name to ldapweb and set the path to "/" that the Web browser will later send the cookie back to all paths on the matching server domain. Preferably, the CGIs do not set a specific expiration date for the cookie so that the cookie value is not retained when the user quits the browser.

After the user or administrator has successfully logged on and carried out a subsequent LDAP GUI task, the LDAP GUI CGIs take the ldapweb cookie sent with the transaction and verify it according to the flowchart illustrated in FIG. 5. This is step 68 in FIG. 3.

The routine begins at step 90 when the LDAP GUI CGIs receive the cookie with the HTTP transaction from the Web browser. At step 92, the CGIs decode the string, converting the ASCII string back to binary At step 94, the CGIs decrypt the string using the corresponding key of the encryption-decryption key pair. The routine then continues at step 96 with the CGIs checking to determine whether the cookie IP address matches against the client IP address that accompanied the Web transaction. If the IP addresses match (or match a known proxy address), the routine continues at step 98. In particular, the CGIs ensure that the extracted user name and password from the cookie are still valid for the LDAP server. If the user name and password are valid, the CGIs continue with the transaction requested by the user at step 100. If the outcome of either step 96 or step 98 is negative, the error message is generated.

Preferably, the cookies are decoded and decrypted when the LDAP GUI CGIs are called and their values are stored in the logged-in LDAP user object that is accessible by the LDAP GUI code.

Logoff Process

If the user desires to logoff from the LDAP CUT without having to exit the Web browser or, if the user desires to login as a different LDAP user, the user must first go through LDAP GUI logoff process as illustrated in the flowchart of FIG. 6.

The routine begins at step 102 with the user navigating to the LDAP GUI logoff panel (e.g., by specifying a logoff action URL usually accessed via a link on the LDAP GUI navigation panel). When the user presses the logoff button at step 103, the routine continues at step 104 with the LDAP GUI Web server CGIs constructing a zero (or null) value ldapweb cookie. At step 106, the CGIs send the cookie name and value back to the Web browser on a refresh page. This is a similar function as described with respect to the login process. The refresh page redirects HTTP flow back to itself with a parameter to check if the cookie was set. The user's Web browser receives the cookie and the refresh page. At step 108, the user and/or the browser accepts or rejects the cookie depending on the browser getting. Regardless, the routine continues at step 110 with the user's Web browser automatically navigating to the refresh redirected page. The ldapweb cookie value, if any, is sent back to the Web server. At step 112, CGIs for the new refresh page check to see if the ldapweb cookie was set to zero. If the ldapweb cookie was not set to zero, the CGIs issue a "cookies not supported" error message at step 114 and return to step 102. If the ldapweb cookie was set to zero, the CGIs return the LDAP GUI login page to the user at step 116. This completes the logoff processing.

One of ordinary skill will appreciate that the present invention provides numerous advantages over the prior art. In particular, known cookie setting mechanisms do not include automatic checks to see if the cookie was set on the Web browser, nor do they include in-depth validation of the cookie value. The invention, on the contrary, removes uncertainty and delay by immediately checking to see if a cookie value was set when the cookie is first sent back to the browser. This is accomplished by the present invention by using a refresh object or page to allow the LDAP GUI CGIs to automatically determine if the cookie was set. Moreover, the cookie value validation process preferably encompasses encryption, encoding, decoding, and decryption, as well as additional validation mechanisms, to ensure that the cookie is valid for the user.

The inventive architecture offers many more advantages over using a server plug-in design with the HTTP 401 method of authentication. First, the design is portable to all HTTP web servers that run CGIs, whereas server plug-ins generally are not. Additionally, the inventive design allows a user to logoff from his or her Web-based application without needing to shutdown all instances of the Web browser.

Although this disclosure focused on the LDAP GUI design, which uses CGIs, it is equally applicable to servlets, plug-ins, and other programs or algorithms that run on the Web server. Moreover, the term "cookie" is not limited to just an HTTP cookie, but rather should be broadly construed to cover any security mechanism that accomplishes a similar functionality.

Although the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would, recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

As noted above, one of the preferred implementations of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, the invention may be used or practiced in any type of Internet Protocol (IP) client, not just within an HTTP-complaint client having a Web browser. Thus, as used herein, references to "browser" should be broadly construed to cover an IP client.

Having thus described our invention, what we claim as new and desire to secure by letters patent is set forth in the following claims.

What is claimed is:

1. A method of enabling a Web browser user to interact with a given application running on a Web server, comprising the steps of:

upon a given occurrence at the Web server, constructing and returning a cookie to the Web browser;

without user input, redirecting the Web browser to a refresh object to allow the given application to determine if the cookie was set on the Web browser;

at the Web server, determining if the cookie is valid; and enabling the user to interact with the given application if the cookie is invalid.

2. The method as described in claim 1 wherein the cookie is a string generated by the following steps:

concatenating into a derived value a userid, a password and other information;

encrypting the derived value to generate a binary string; and encoding the binary string.

3. The method as described in claim 2 wherein the other information is a client destination address.

4. The method as described in claim 3 wherein the step of determining whether the cookie is valid comprises:

decoding the string to generate a resulting binary value;

decrypting the resulting binary value to generate a resulting derived value;

determining whether the destination address in the resulting derived value matches a destination address of a client machine on which the Web browser is running;

if the destination addresses match, determining whether the user name and password in the resulting derived value match the user's user name and password; and if the user name and password match, enabling the user to interact with the application.

5. The method as described in claim 1 wherein the redirecting step includes the step of sending the cookie from the Web client back to the Web server to enable the given application to determine if the cookie is valid.

6. The method as described in claim 1 wherein the given occurrence is a valid login to the given application.

7. The method as described in claim 6 wherein the given application is an Lightweight Directory Access Protocol (LDAP) GUI interface.

8. The method as described in claim 7 wherein the user interacts with the LDAP GUI interface to take a given action.

9. The method as described in claim 7 wherein the user interacts with the LDAP GUI interface to log off from the LDAP GUI without having to exit the Web browser.

10. A method of enabling a Web browser user to interact with a given application running on a Web server, comprising the steps of:

upon a valid user login at the Web server, constructing a cookie;

returning the cookie to the Web browser in a refresh page the redirects HTTP flow back to itself with a given parameter;

returning the cookie back to the Web server;

at the Web server, using the returned cookie and the given parameter to determine if the cookie is valid; and enabling the user to interact with the given application if the cookie is valid.

11. The method as described in claim 10 wherein the cookie is an ASCII string constructed by the following steps:

concatenating into a derived value a userid, a password and other information;

encrypting the derived value to generate a binary string; and encoding the binary string.

12. The method as described in claim 11 wherein the other information is a client IP address.

13. The method as described in claim 12 wherein the step of determining whether the cookie is valid comprises:

decoding the ASCII string to generate a resulting binary value;

decrypting the resulting binary value to generate a resulting derived value;

determining whether the IP address in the resulting derived value matches an IF address of a client machine on which the Web browser is running;

if the IP addresses match, determining whether the user name and password in the resulting derived value match the user's user name and password; and if the user name and password match, enabling the user to interact with the application.

14. The method as described in claim 10 wherein the given application is an Lightweight Directory Access Protocol (LDAP) GUI interface.

15. The method as described in claim 14 wherein the user interacts with the LDAP GUI interface to take a given action.

16. The method as described in claim 10 wherein the user interacts with the LDAP GUI interface to log off from the LDAP GUI without having to exit the Web browser.

17. A computer program product in a computer-readable medium for enabling a Web browser user to interact with a given application running on a Web server, comprising:

means for constructing a cookie;

means for returning the cookie to the Web browser in a refresh page the redirects HTTP flow back to itself with a given parameter;

means for determining if the cookie is valid; and means responsive to the determining means for enabling the user to interact with the given application if the cookie is valid.

18. The computer program product as described in claim 17 wherein the cookie is a string and the means for constructing comprises:

means for concatenating into a derived value a userid, a password and other information;

means for encrypting the derived value to generate a binary string; and means for encoding the binary string to generate the string.

19. The computer program product as described in claim 18 wherein the other information is a client destination address.

20. The computer program product as described in claim 18 wherein the means for determining comprises:

means for decoding the string to generate a resulting binary value;

means for decrypting the resulting binary value to generate a resulting derived value;

means for determining whether the destination address in the resulting derived value matches a destination address of a client machine on which the Web browser is running;

means responsive to a destination address match for determining whether the user name and password in the resulting derived value match the user's user name and password; and means responsive to match of the user name and password for enabling the user to interact with the application.

* * * * *

UNITED STATES PATENT AND TRADEMARK OFFICE
CERTIFICATE OF CORRECTION

PATENT NO. : 6,374,359 B1
DATED : April 16, 2002
INVENTOR(S) : Shrader et al.

It is certified that error appears in the above-identified patent and that said Letters Patent is hereby corrected as shown below:

<u>Column 9,</u>
Line 55, "invalid" should read -- valid --.

<u>Column 10,</u>
Line 57, "IF" should read -- IP --.

Signed and Sealed this

Fifth Day of November, 2002

Attest:

JAMES E. ROGAN
Attesting Officer
Director of the United States Patent and Trademark Office